United States Patent
Marko et al.

(10) Patent No.: US 6,614,767 B1
(45) Date of Patent: *Sep. 2, 2003

(54) METHOD AND APPARATUS FOR CONTINUOUS CROSS-CHANNEL INTERLEAVING

(75) Inventors: Paul D. Marko, Pembroke Pines, FL (US); Craig P. Wadin, Sunrise, FL (US); Joseph M. Titlebaum, Bethesda, MD (US)

(73) Assignee: XM Satellite Radio Inc., Washington, DC (US)

( * ) Notice: Subject to any disclaimer, the term of this patent is extended or adjusted under 35 U.S.C. 154(b) by 338 days.

This patent is subject to a terminal disclaimer.

(21) Appl. No.: 09/688,824

(22) Filed: Oct. 17, 2000

Related U.S. Application Data

(63) Continuation of application No. 09/318,938, filed on May 26, 1999, now Pat. No. 6,154,452.

(51) Int. Cl.[7] .............................................. H04B 7/212
(52) U.S. Cl. ........................ 370/321; 370/347; 375/347; 714/762
(58) Field of Search ................................ 370/321, 204, 370/347, 206, 312; 714/762, 702; 375/299, 347, 260, 295; 455/10, 13.1

(56) References Cited

U.S. PATENT DOCUMENTS

| | | | |
|---|---|---|---|
| 4,429,390 A | 1/1984 | Sonoda et al. | 714/762 |
| 4,622,598 A | 11/1986 | Doi et al. | 360/22 |
| 4,881,241 A | 11/1989 | Pommier et al. | 375/260 |
| 5,191,576 A | 3/1993 | Pommier et al. | 370/18 |

(List continued on next page.)

FOREIGN PATENT DOCUMENTS

| | | | |
|---|---|---|---|
| WO | 0036783 | 6/2000 | H04L/1/06 |

OTHER PUBLICATIONS

Kallel, Samir, "Complementary Punctured Convolutional (CPC) Codes and Their Applications", IEEE Transactions on Communications, vol. 43, No. 6, Jun. 1995, pp. 2005–2009.

Cain, J. Bibb, "Punctured Convolutional Codes of Rate (n–1)/n and Simplified Maximum Likelihood Decoding", IEEE Transactions on Information Theory, vol. IT–25, No. 1, Jan. 1979, pp. 97–100.

D. Kail, "Direct Radio Broadcasting By Satellite (DRBS): A Review of the Technical Factors and System Approaches Suitable for Mobile and Fixed Reception", BBC RD Apr. 1989, pp. 1–22(©British Broadcasting Corporation 1989).

Kroeger et al., "Robust modem and coating techniques for FM Hybrid IBOC DAB," IEEE Transactions on Broadcasting, vol. 43, No. 4, Dec. 1997, pp. 412–420.

*Primary Examiner*—Hassan Kizou
*Assistant Examiner*—John Pezzlo
(74) *Attorney, Agent, or Firm*—Roylance, Abrams, Berdo & Goodman, LLP

(57) ABSTRACT

A method of interleaving data for transmission is provided wherein first and second interleaving patterns for arranging data symbols in a source data stream into first and second transmitted data streams are selected. Each of said data symbols has at least one bit. The first and second transmitted data streams are transmitted substantially simultaneously on separate transmission channels to at least one receiver. The first and second patterns are used to transmit the data symbols in the source data stream in a different order on the respective transmission channels to maximize recovery of the source data stream when the transmission channels are blocked. The selected interleaving patterns can involve reordering the data symbols throughout the first and second transmitted data streams using different reordering criteria The reordering. criteria can vary on a frame-by-frame basis if the source data stream is time division multiplexed. Complementary data can be sent on respective transmission channels.

7 Claims, 14 Drawing Sheets

U.S. PATENT DOCUMENTS

| | | | |
|---|---|---|---|
| 5,197,061 A | 3/1993 | Halbert-Lassalle et al. | 370/11 |
| 5,228,025 A | 7/1993 | Le Floch et al. | 370/206 |
| 5,278,863 A | 1/1994 | Briskman | 375/130 |
| 5,283,780 A | 2/1994 | Schuchman et al. | 370/50 |
| 5,305,353 A | 4/1994 | Weerackody | 375/347 |
| 5,319,673 A | 6/1994 | Briskman | 455/13.1 |
| 5,485,485 A | 1/1996 | Briskman et al. | 375/130 |
| 5,592,471 A | 1/1997 | Briskman | 455/506 |
| 5,720,039 A | 2/1998 | Lieberman | 455/10 |
| 5,745,839 A | 4/1998 | Lieberman | 455/10 |
| 5,794,138 A | 8/1998 | Briskman | 455/344 |
| 5,848,103 A | 12/1998 | Weerackody | 375/295 |
| 5,864,579 A | 1/1999 | Briskman | 375/130 |
| 6,154,452 A * | 11/2000 | Marko et al. | 370/321 |
| 6,247,152 B1 | 6/2001 | Smallcomb | 714/786 |

* cited by examiner

METHOD AND APPARATUS FOR CONTINUOUS CROSS-CHANNEL INTERLEAVING

This application is a continuation of U.S. patent application Ser. No. 09/318,938 filed May 26, 1999, now U.S. Pat. No. 6,154,452 issued Nov. 28, 2000.

FIELD OF THE INVENTION

The present invention relates to a method and apparatus for performing cross-channel interleaving between at least two transmitted data streams. The present invention further relates to a method and apparatus for performing continuous cross-channel interleaving on two or more data streams.

BACKGROUND OF THE INVENTION

Service outages can occur in systems which broadcast data, video, audio and other information using radio frequencies. These outages can prevent receivers, and particularly mobile receivers, from receiving the broadcast service altogether, or cause them to receive a signal so degraded that the service is rendered unacceptable. These outages are generally due to physical blockage of transmission paths between the transmitter and receiver (e.g., due to mountainous terrain or long tunnels) and multipath fading and reflection of the transmission path.

Satellite broadcast systems can use two transmission channels to provide time and/or space diversity for mitigating service outages due to multipath, physical blockages and interference in mobile broadcast receivers. These time diversity systems, however, are disadvantageous for reasons which will be illustrated below in connection with FIG. 4. FIG. 1 depicts a satellite broadcast system 10 employing time diversity which comprises at least one geostationary satellite 12 for line of sight (LOS) satellite signal reception at receivers indicated generally at 14. Another geostationary satellite 16 at a different orbital position is provided for time and/or space diversity purposes. The system 10 further comprises at least one terrestrial repeater 18 for retransmission of satellite signals in geographic areas where LOS reception is obscured by tall buildings, hills and other obstructions. The receivers 14 can be configured for dual-mode operation to receive both satellite signals and terrestrial signals and to combine or select one or both of the signals as the receiver output. However, it will be understood that, where the receivers are in a fixed location, it is sufficient for such receivers to operate by receiving signals from a single source and that is may reduce the cost and complexity of such receivers if they are designed for single mode operation.

The satellite broadcast segment preferably includes the encoding of a broadcast channel into a time division multiplexed (TDM) bit stream. The TDM bit stream is modulated prior to transmission via a satellite uplink antenna. The terrestrial repeater segment comprises a satellite downlink antenna and a receiver/demodulator to obtain a baseband TDM bitstream. The digital baseband signal is applied to a terrestrial waveform modulator, and is then frequency translated to a carrier frequency and amplified prior to transmission.

The problem associated with broadcast systems based on time diversity can be understood from FIGS. 2–4. With reference to FIG. 2, a transmission channel 60 from a late satellite, for example, is delayed by a predetermined amount of time (e.g., ten 432 millisecond (ms) frames) with respect to the other channel 62. Receivers are therefore configured to receive both transmission channels 60 and 62 and to add an identical delay to the channel 62 that was not earlier subjected to the predetermined amount of delay. With reference to FIG. 3, the two received streams 64 and 66 are then compared and combined as indicated at 68. In optimal situations, the combined stream 68 is a continuous stream of the original broadcast, even though one or both of the channels 60 or 62 may not have been receivable during a temporary service outage. This is true if the data transmitted during the outage was successfully received from the other channel during the outage period or, in cases where both channels are blocked simultaneously, if the outage does not exceed the time delay between the channels. As an illustration of the latter situation, the signal blockage 70 that occurred in both of the two recovered bit streams 64 and 66 of FIG. 3 (i.e., the loss of frames 10 through 19 in channel 60 and loss of frames 20 through 29 in channel 62) is recovered in the combined recovered bit stream 68. With reference to FIG. 4, problems in recovering the source data stream for channels 60 or 62 can occur when one of the satellite paths is completely blocked due to terrain, for example. The blocked signal 72 (i.e., frames 23 through 27) in the early satellite channel cannot be recovered from the late satellite channel, resulting in an audio mute interval 74, as shown in the recovered data bit stream 68. This audio mute interval 74 is an error interval that is too large to be mitigated by error concealment techniques. As stated previously, satellite broadcast systems can be reinforced using terrestrial repeaters. While a repeater can be used to provide for the transmission of the source data stream when LOS signal reception of a satellite channel is obstructed, repeaters represent a substantial additional system cost and are generally only implemented in urban centers and suburban areas. Accordingly, a need exists for a satellite broadcast system which provides error concealment in a single satellite coverage environment without requiring a terrestrial reinforcement system.

Another approach for minimizing the effect of noise bursts and fading in a data transmission system involves spreading source bits over time in a data stream using interleaving. An interleaver is generally implemented using a block structure or a convolutional structure.

Using a block structure, a matrix of predetermined size is selected (e.g., m rows and n columns). An input data stream is read into a shift register matrix. The bits in the data stream fill consecutive matrix rows with data folding into the next row as each row is filled. The separation of data elements in a column is therefore n bits, which corresponds to the interleaving depth being used. The data elements in each column are then coded and transmitted by row. The received bits are applied to an identical shift register matrix at the decoder. Data elements are decoded per column prior to being read out per row. When a noise burst occurs to all bits in a single row of an interleaved word (i.e., for n * c seconds wherein c is the bit period), only one bit of the coded word is corrupted. The n bits of the affected row can be corrected individually.

Unlike a block interleaver, which interleaves blocks of data independently of each other, a convolutional interleaver is a feed-forward type of coder which continuously produces an output. A block interleaver, on the other hand, assembles and stores blocks of bits prior to interleaving. Block interleavers have disadvantages. A block interleaver cannot fully decode a received data stream until all of the m * n bits, as set forth in the previous example, arrive at the receiver and are de-interleaved. The size of the matrix therefore is an important consideration. A need therefore exists for an interleaving method which operates on a continuous data stream, which allows for relatively simple de-interleaving at the decoder, and which is not subject to the problems associated with block interleaving.

SUMMARY OF THE INVENTION

In accordance with an aspect of the present invention, a method for interleaving a data stream for transmission is provided which overcomes a number of disadvantages associated with existing interleaving methods and realizes a number of advantages, particularly in multiple satellite broadcast systems during periods of single satellite coverage. The interleaving method of the present invention involves generating two or more interleaved channels from a source data stream. The broadcast signals from these channels are transmitted at the same time, but the data in the broadcast signals are interleaved separately.

In accordance with another aspect of the present invention, the separately interleaved data can correspond to frames in a time division multiplexed data stream, to code blocks or to sub-frames.

In accordance with the present invention, the interleaved channels comprise the same data, although the data is arranged differently between the channels. In an alternative embodiment of the present invention, the interleaved channels are provided with complementary data rather than identical data. The complementary data from the respective channels can be recovered to reconstruct the original data stream. If part of the complementary data is lost during transmission, techniques such as smoothing, concealment algorithms, interpolation, error correction algorithms, or other methods can be used to conceal loss of complementary data. For example, the interleaved channels can comprise right and left stereo signals, respectively. The data stream can be divided into complementary data in other ways such as providing treble and bass signals, or another frequency division of signals, to separate channels. Odd and even numbered frames in the data stream can be provided to respective ones of the interleaved channels. Different portions of the sine wave characterizing the data stream can be applied to different interleaved channels.

In accordance with another aspect of the present invention, the interleaving method of the present invention is used to generate two satellite channels from a source data stream. A receiver is provided to receive the two satellite channels, to de-interleave the respective cross-channel, interleaved satellite channels, and to combine the recovered data streams.

BRIEF DESCRIPTION OF THE DRAWINGS

These and other features and advantages of the present invention will be more readily comprehended from the following detailed description when read in connection with the appended drawings, which form a part of this original disclosure, and wherein.

Throughout the drawing figures, like reference numerals will be understood to refer to like parts and components.

DETAILED DESCRIPTION OF THE PREFERRED EMBODIMENTS

A method for performing cross-channel interleaving continuously on a transmitted data stream in accordance with the present invention will first be described with reference to FIGS. 5–7. An exemplary apparatus for implementing continuous cross-channel interleaving in accordance with the present invention will then be described with reference to FIGS. 8–15. De-interleaving in accordance with the present invention is described with reference to an exemplary application, that is, a satellite digital audio radio service (SDARS) which implements continuous cross-channel interleaving at the transmitter or broadcast station. FIG. 16 is an exemplary three-arm receiver that implements de-interleaving in accordance with the present invention.

Figure 1:
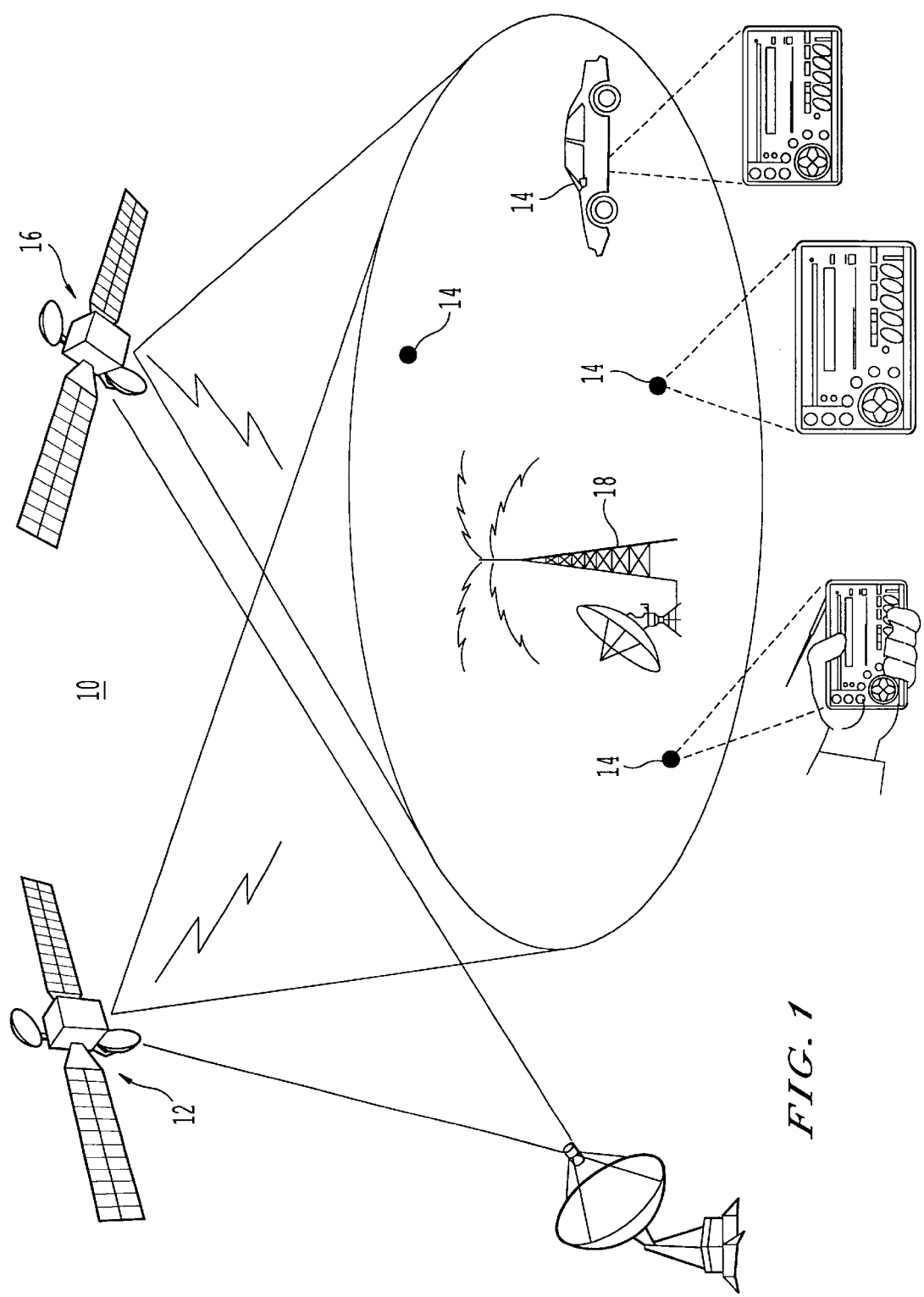
FIG. 1 depicts a digital broadcast system for transmitting satellite signals and terrestrial signals.
Figure 2:
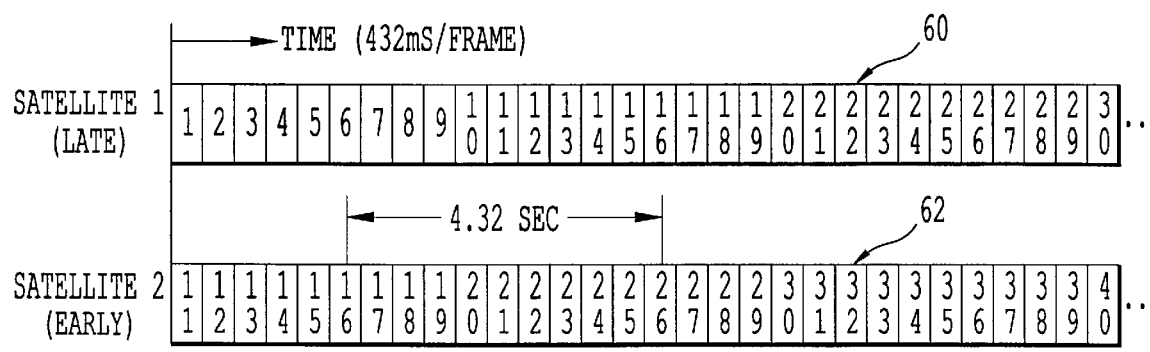
FIG. 2 depicts frames in a late satellite signal which are time-delayed with respect to frames in an early satellite signal in a conventional time diversity satellite broadcast system.
Figure 5:
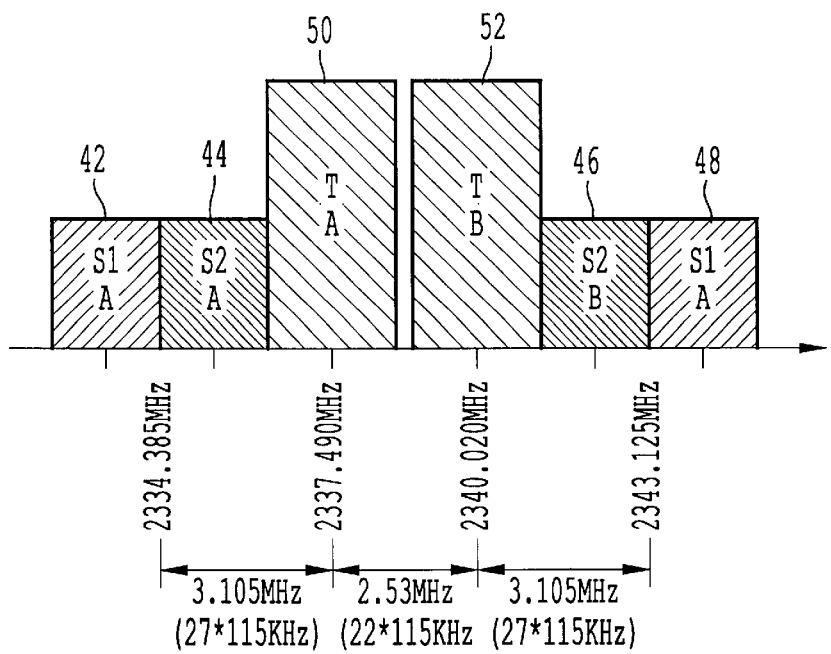
FIG. 5 illustrates a frequency plan for satellite signals and terrestrial signals in a broadcast system.
Figure 3:
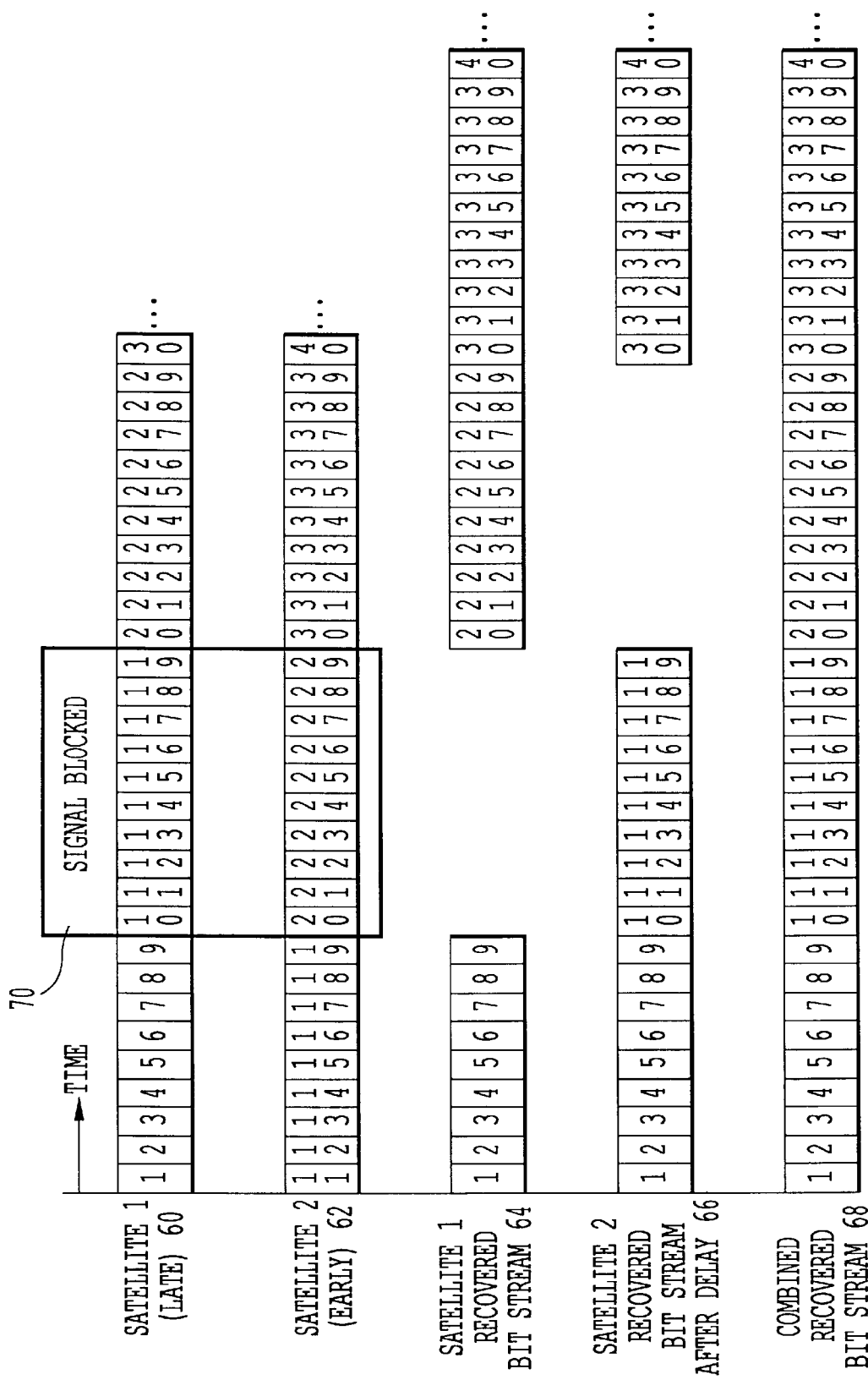
FIG. 3 illustrates the recovered and combined bit streams in a conventional time diversity satellite broadcast system.
Figure 6:
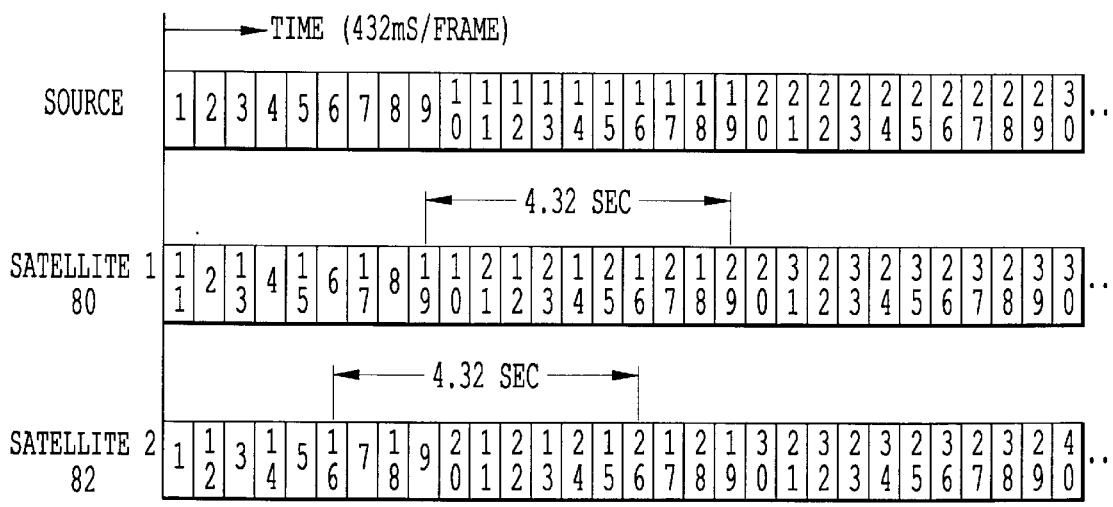
FIG. 6 illustrates two continuous, cross-channel, interleaved data streams in accordance with an embodiment of the present invention.
Figure 7:
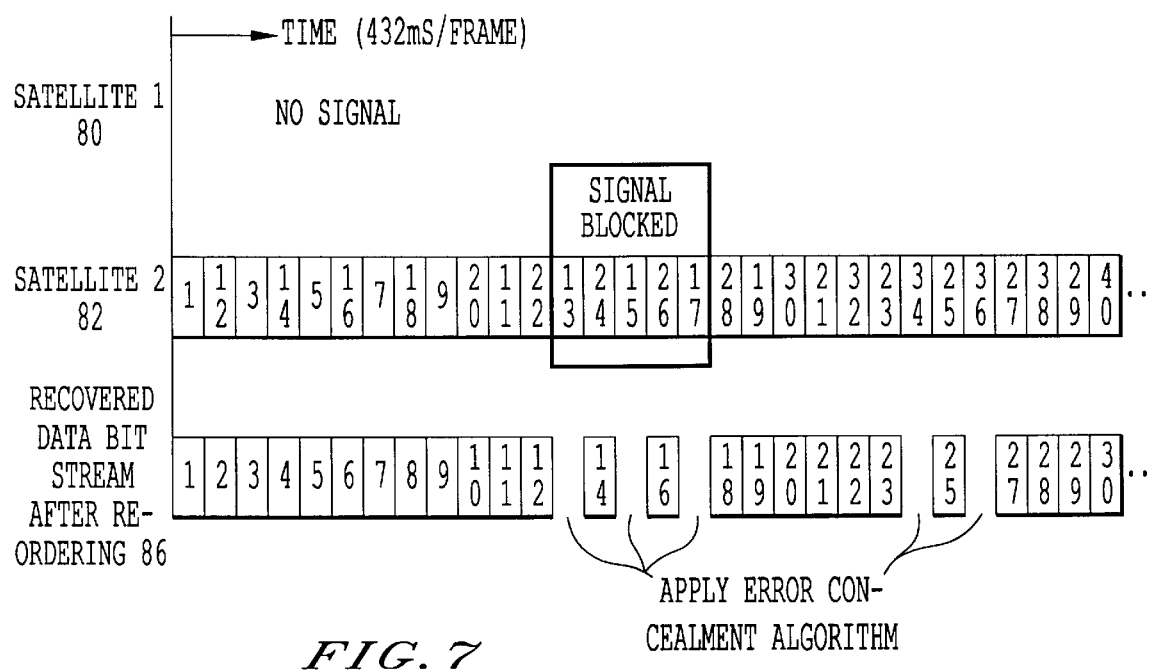
FIG. 7 illustrates a recovered data stream when the two data transmission channels depicted in FIG. 6 are completely obstructed and momentarily blocked, respectively.

With reference to FIG. 6, continuous cross-channel interleaving in accordance with the present invention is applied to two data streams 80 and 82 prior to transmission. For example, the data streams 80 and 82 can be assembled and interleaved at a broadcast station prior to transmission to respective satellites 12 and 16 in a satellite broadcast system 10 as illustrated in FIG. 1. For illustrative purposes, the two data streams 80 and 82 shall hereinafter be referred to as the first satellite channel 80 and the second satellite channel 82. The first and second satellite channels 80 and 82 can occupy the frequency bands depicted in FIG. 5, as described below. The first satellite channel 80, however, is not delayed with respect to the second satellite channel 82, as it would be in a time diversity system. This important difference is discussed in detail below. It is to be understood that the continuous cross-channel interleaving method of the present invention can be employed with any data stream to be transmitted on two or more channels in any type of digital transmission system.

A frequency plan for a two-satellite broadcast system is depicted in FIG. 5. For example, the satellites 12 and 16 of FIG. 1 can each broadcast the same programs A and B. The satellite 12 transmits the programs A and B at the same time as satellite 16. The broadcast signals from the satellites 12 and 16, however, are interleaved such that the bit streams are in different order. The frequency plan assigns frequency bands for each of the four satellite signals as indicated at 42, 44, 46 and 48, respectively, in FIG. 5. In addition, two frequency bands 50 and 52 are assigned to the program A and B signals transmitted from the terrestrial repeaters.

As shown in FIG. 6, the source data stream 84 comprises a number of frames which are numbered consecutively (i.e., 1, 2, 3, . . . ,n) for illustrative purposes. In SDARS, the frames are preferably 432 ms frames. In accordance with the present invention, the frames are interspersed in the transmitted data stream. In the illustrated embodiment, a ten-frame interleaving algorithm is used. The frames are dispersed as alternating frames with even-numbered frames advanced by ten frames with respect to odd-numbered frames in the transmitted signal. Correspondingly, a ten-frame interleaving or reordering process can also be used with the second satellite channel 82. In the second satellite channel, the odd-numbered frames can be advanced by ten frames with respect to the even-numbered frames. As will be described below, the use of such interleaved frames increases the likelihood of recovering the source bit stream 84 when signal blockage occurs in both of the first and second satellite channels, as well as when LOS reception of one of the satellite channels is obstructed.

The number of interleaved frames can be any selected number. In addition, the selected amount of frame advancement is not limited to selected integer numbers of frames. For example, the interleaving algorithm of the present invention can be based on a code-block level, that is, on sub-frame components hereinafter referred to as code blocks. The location of the interleaved data elements (e.g., frames or code blocks) is also not limited to alternate positions in the transmitted data streams. The data in the broadcast signals from each of the satellites can be grouped or interspersed in the transmitted data stream by any manner or in any order. In addition, different algorithms can be used in the respective frames of predetermined groups of frames, which consist of a selected number of consecutive frames, within the broadcast signals provided by a single satellite.

The selection of the manner in which the data are provided in the transmitted data streams are design choices which take into consideration the memory requirements of the receiver and transmitter devices, as well as the types of outages which occur in the data transmission system and the effectiveness with which data can be recovered. An interleaver constructed in accordance with the illustrated embodiment of the present invention employs a buffer memory for the first satellite channel 80 which stores five frames (i.e., five even numbered frames such as frames 2, 4, 6, 8 and 10 in FIG. 6). Similarly, the interleaver employs a buffer memory for the second satellite channel to store five frames (i.e., five odd numbered frames such as frames 1, 3, 5, 7 and 9 in FIG. 6). These buffer memories are described below in connection with FIG. 8.

Figure 4:
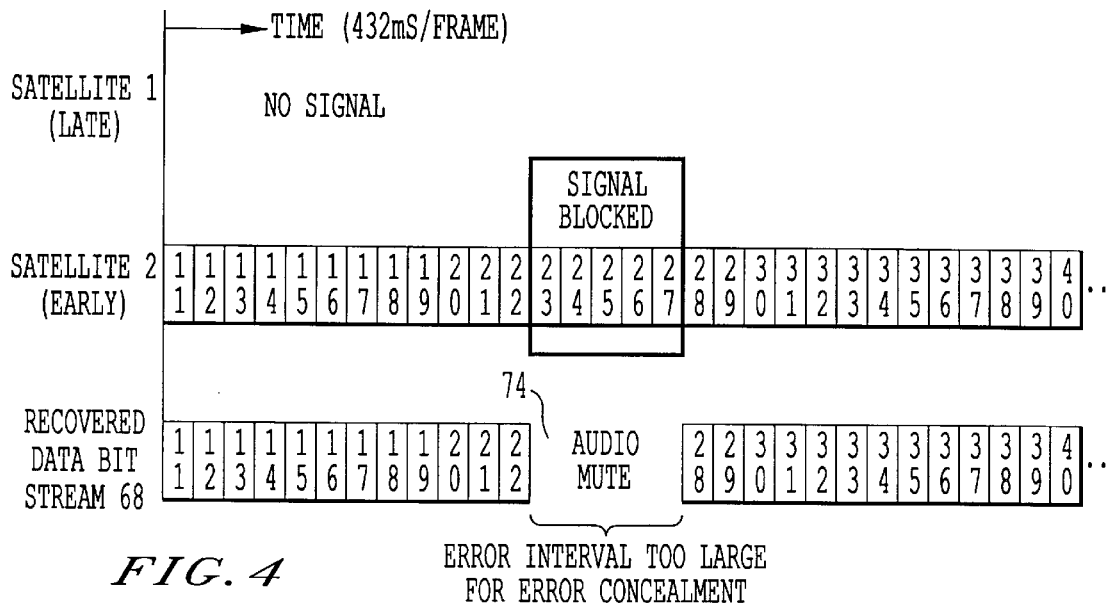
FIG. 4 depicts a recovered data stream in a conventional time diversity satellite system in which one satellite signal is completely obstructed and another satellite signal is temporarily blocked.

One of the advantages of the continuous cross-channel interleaving method of the present invention is improved error concealment at the receivers during times of broadcast signal blockage. As discussed above with reference to FIG. 4, a signal blockage of five consecutive frames, for example, in a time diversity system causes an audio mute interval (e.g., interval 74). By contrast, the same blockage in a system using the interleaving method of the present invention allows the source bit stream to be recovered using audio error concealment algorithms. As shown in FIG. 7, the first satellite channel 80 is blocked altogether (e.g., obstructed by terrain), and the cross-channel interleaved second satellite channel 82 is momentarily blocked for five frames (e.g., frames 13, 24, 15, 26 and 17), by way of an example. Following reception and reordering of the second satellite channel, the recovered data stream 86 contains only single frame outages, as opposed to the outage of five frames shown in FIG. 6. The single frame outages are short enough to apply audio error concealment algorithms. The operation of the audio error concealment algorithms can be further enhanced by reducing the frame length and thereby reducing the concealment intervals. Alternatively, audio signals in the source bit stream can be split into two half-bit rate data streams. For example, the odd and even frames can carry respective ones of the two half-bit rate audio streams. Thus, if a frame can carry a 64 kilobit per second (kbps) audio channel, and satellite signal blockage occurs, then at least 32 kbps or half-bit rate audio is available during the service outage.

Figure 8:
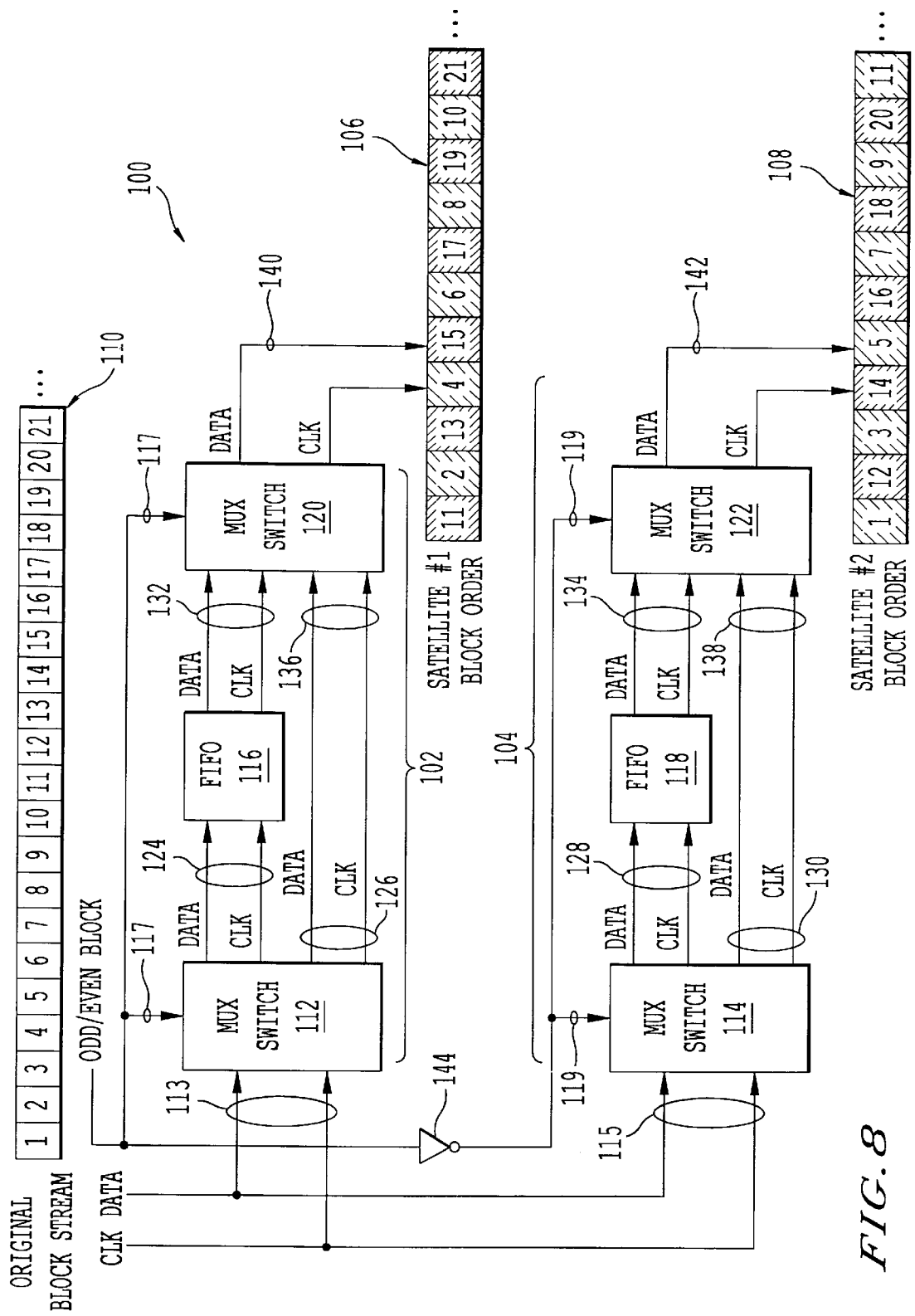
FIGS. 8–15 depict an interleaver circuit constructed in accordance with an embodiment of the present invention for creating continuous, cross-channel, interleaved data streams during respective clock cycles.

An exemplary interleaver circuit 100 for implementing continuous cross-channel interleaving in accordance with the present invention will now be described with reference to FIGS. 8 through 15. The interleaver circuit 100 can be employed, for example, at a broadcast station in a digital satellite broadcast system 10 employing two satellites 12 and 16. With reference to FIG. 8, the interleaver circuit 100 can generate two interleaved streams 80 and 82 from a source bit stream 84 which can then be modulated and transmitted to respective satellites 12 and 16 on one or two carrier frequencies.

As shown in FIG. 8, the interleaver circuit 100 comprises two branches 102 and 104 for generating the first and second data streams 106 and 108 from a source data stream 110. The first and second data streams 106 and 108 can then be processed for transmission to respective satellites, for example. Branches 102 and 104 comprise multiplexer switches 112 and 114, first-in-first-out (FIFO) registers 116 and 118, and multiplexer switches 120 and 122, respectively. The multiplexer switches 112 and 114 each have a clock input and a data input pair 113 and 115, and a control inputs 117 and 119, respectively. Each multiplexer switch 112 and 114 also has two output pairs. The output pairs 124 and 126 of the multiplexer switch 112 and the output pairs 128 and 130 of the multiplexer switch 114 each comprise a data output and a clock signal output. The output pairs 124 and 128 are for reordering frames and are connected to a corresponding FIFO register 116 and 118. These output pairs 124 and 128 are each hereinafter referred to as a first output pair. The other output pairs 126 and 130 are for outputting frames to the other corresponding multiplexer switch 120 or 122 and are both hereinafter referred to as a second output pair. The multiplexer switches 120 and 122 each comprise a first input pair 132 and 134, a second input pair 136 and 138 and an output 140 and 142, respectively, as shown in FIG. 8.

The corresponding control inputs 117 and 119 of the multiplexer switches 112, 114, 120 and 122 are preferably gated every frame or code block cycle. This clock cycle is propagated through each branch 102 and 104 by the respective devices in the branches. An inverter 144 is provided so that the corresponding control input 117 and 119 to the multiplexer switches 112, 114, 120 and 122 change state when the next incoming frame or code block in the original data stream 110 is detected. The multiplexer switches 112 and 114 select the first output pair or the second output pair depending on the state of the control input. Similarly, the multiplexer switches 120 and 122 provide one of their input pair 132 and 134 from the corresponding FIFO register 116 and 118, or their input pair 136 and 138 to their output 142 and 144, depending on the state of the control input 117 and 119.

The interleaved channels 106 and 108 generated using the illustrated original data stream 110 are shown at the corresponding data outputs 142 and 144 of the multiplexer switches 120 and 122 in FIG. 8. The process of generating these interleaved data streams 106 and 108 is illustrated on a frame-by-frame (or code-block-by-code-block) basis in FIGS. 9–15. For the purposes of discussion, the interleaving of the original data stream 110 will be described on a frame-by-frame basis with the frames being numbered using integer numbers. A ten frame interleaving algorithm is used with respect to the alternating frames for illustrative purposes. The branch 102 generates a data stream 106 having selected even-numbered frames interspersed relative to odd-numbered frames. Conversely, the branch 104 generates a data stream 108 having selected odd-numbered frames interspersed relative to even-numbered frames.

Figure 9:
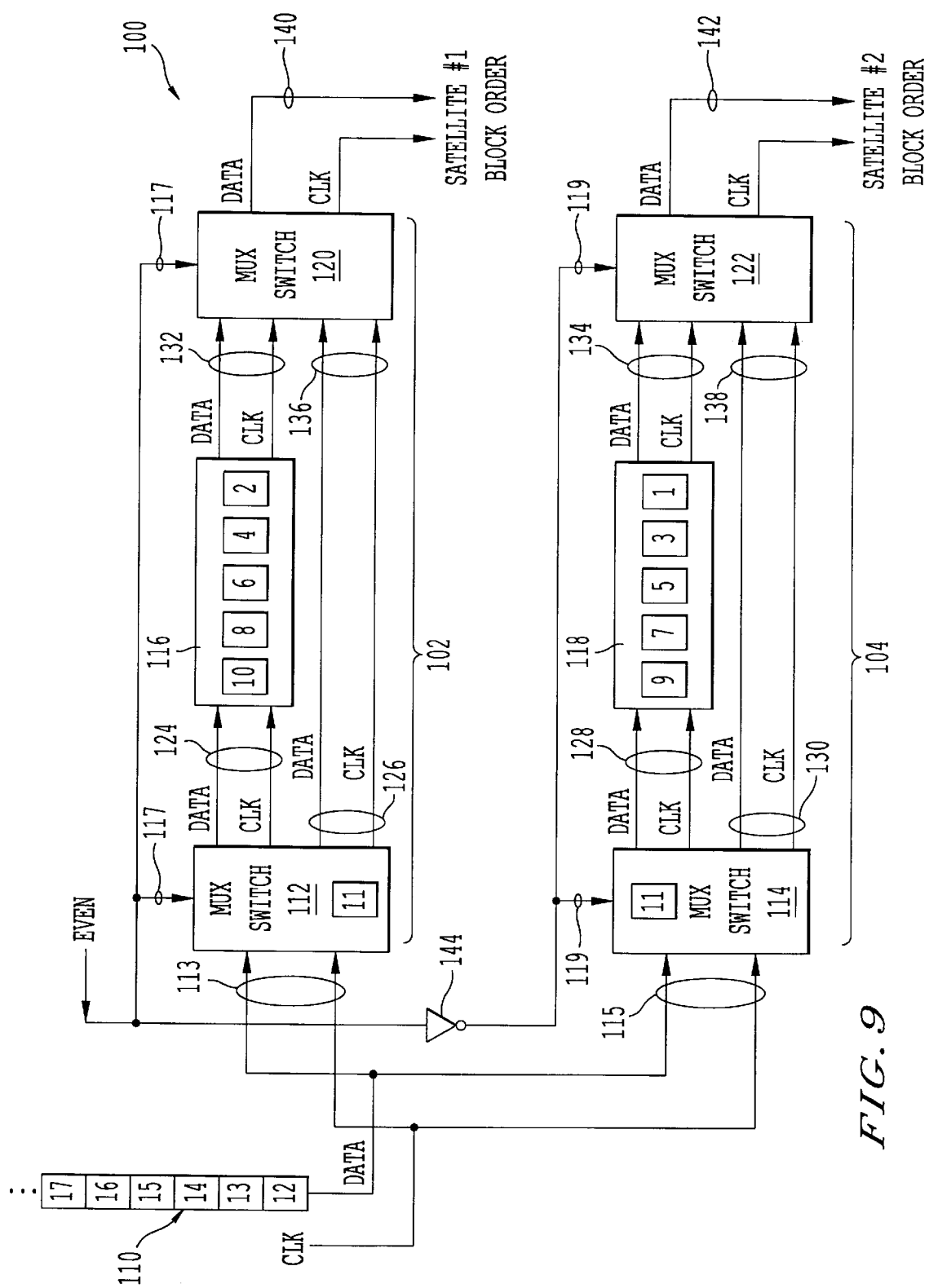
Figure 11:
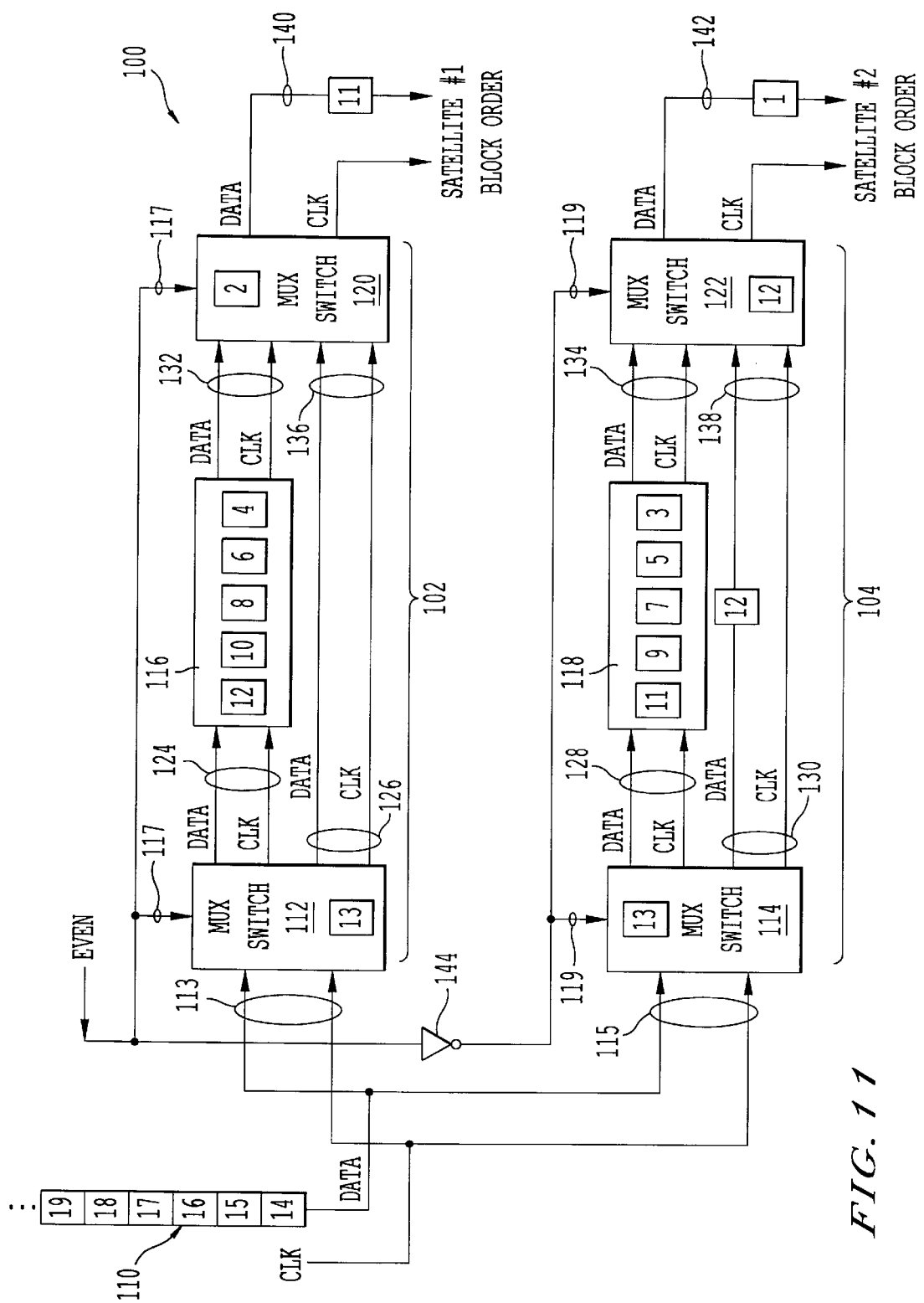

With reference to FIG. 9, frames 11 through 21 are depicted at the inputs of the multiplexer switches 112 and 114 for illustrative purposes. The frames 2, 4, 6, 8 and 10 are stored in the FIFO register 116. The frames 1, 3, 5, 7 and 9 are stored in the FIFO register 118. As shown in FIG. 9, the beginning of frame 11 has been determined in a conventional manner during a prior clock cycle, and the corresponding control input signals 117 and 199 to the multiplexer switches 112 and 114 has caused the odd-numbered frame 11 to be provided at the output pair 126 of the multiplexer switch 112 and at the output pair 128 of the multiplexer switch 114. The current control signal indicates that an even frame (i.e., frame 12) is being presented as the input to the multiplexer switches 112 and 114. During the next clock cycle, as shown in FIG. 11, the multiplexer switch 112 provides the frame 12 to the output pair 124 thereof in accordance with the even control signal, while the multiplexer switch 114 is controlled to provide the frame 12 to the output pair 130 thereof. In addition, the frame 11 is presented at the input pair 136 of the multiplexer switch 120, as well as being shifted into the shift register 118 of the branch 104. Accordingly, the frame 1 in branch 104 is shifted into the multiplexer switch 122.

Figure 10:
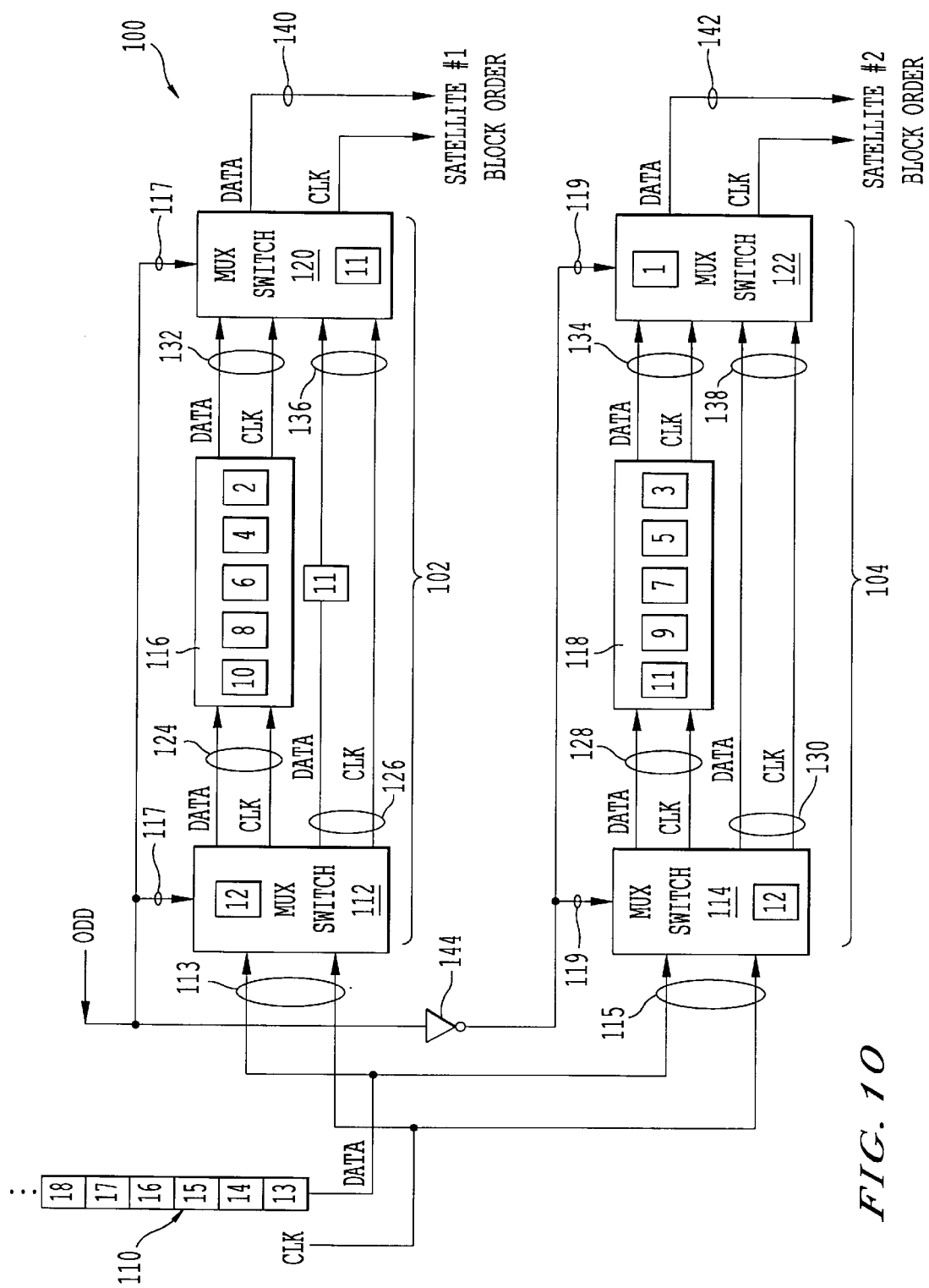

In accordance with the odd control signal indicated in FIG. 10, the multiplexer switch 112 provides the frame 13 to the output pair 126 thereof during the next clock cycle, as shown in FIG. 11, while the frame 12 is shifted into the FIFO register 116, 118 of branch 102. Thus, the frame 2 is shifted from the FIFO register 116 into the multiplexer switch 120, while the frame 11 is provided as the output of the multiplexer switch 120. The multiplexer switch 114, on the other hand, provides the frame 13 to the output pair 128 thereof, and frame 12 is shifted into the multiplexer switch 122. Accordingly, frame 1 is provided at the output 142 of the multiplexer switch 122.

Figure 12:
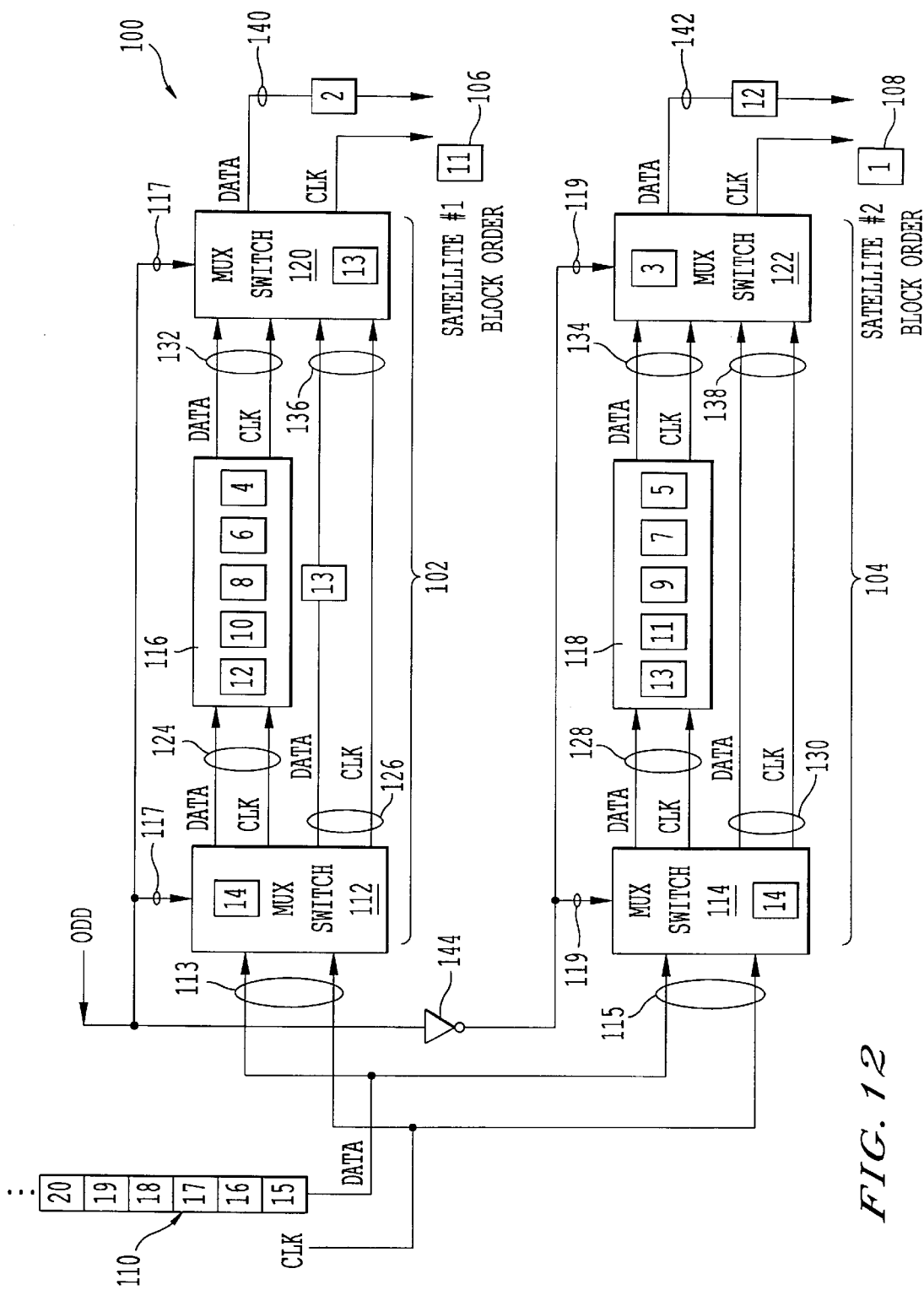

During the next clock cycle and in accordance with the even control signal depicted in FIG. 11, the multiplexer switch 112 provides the frame 14 to the output pair 124 thereof, as shown in FIG. 12. Frame 12 is shifted into the FIFO register 116. The multiplexer switch 120 receives the frame 13 as an input and outputs the frame 2. The multiplexer switch 114 is controlled to provide the frame 14 to the output pair 130 thereof. Frame 13 is shifted into the shift register 118. Accordingly, the frame 3 is shifted into the multiplexer switch 122, while frame 12 is presented at its output.

Figure 13:
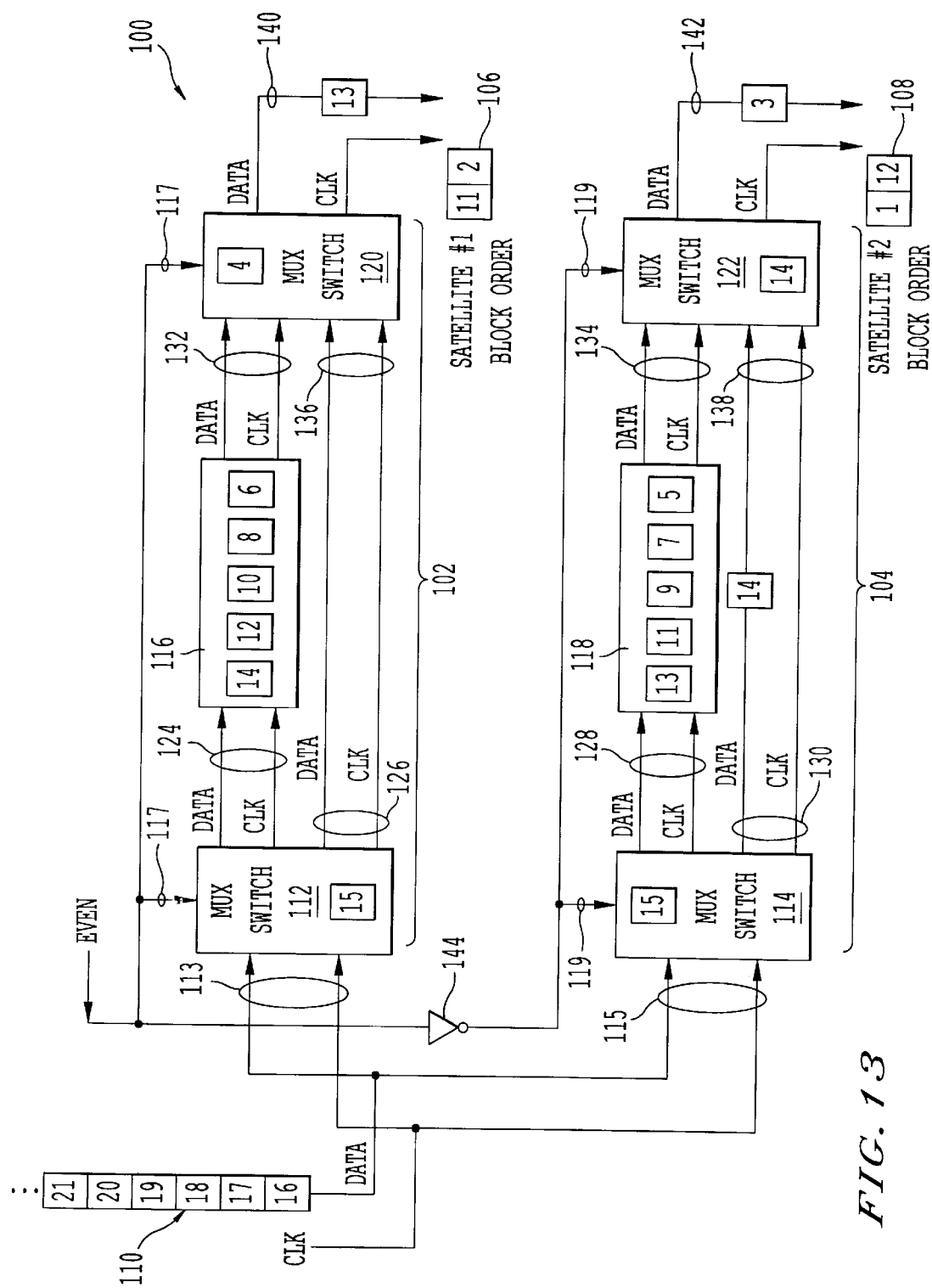

In accordance with the odd control signal indicated in FIG. 12, the multiplexer switch 112 provides the frame 15 to the output pair 126 thereof during the next clock cycle, as shown in FIG. 13, while the frame 14 is shifted into the FIFO register 116. Thus, the frame 4 is shifted from the FIFO register 116 into the multiplexer switch 120, while the frame 13 is provided as the output of the multiplexer switch 120. The multiplexer switch 114, on the other hand, provides the frame 15 to the output pair 128 thereof. Frame 14 is shifted into the multiplexer switch 122. Accordingly, frame 3 is provided at the output of the multiplexer switch 122.

Figure 14:
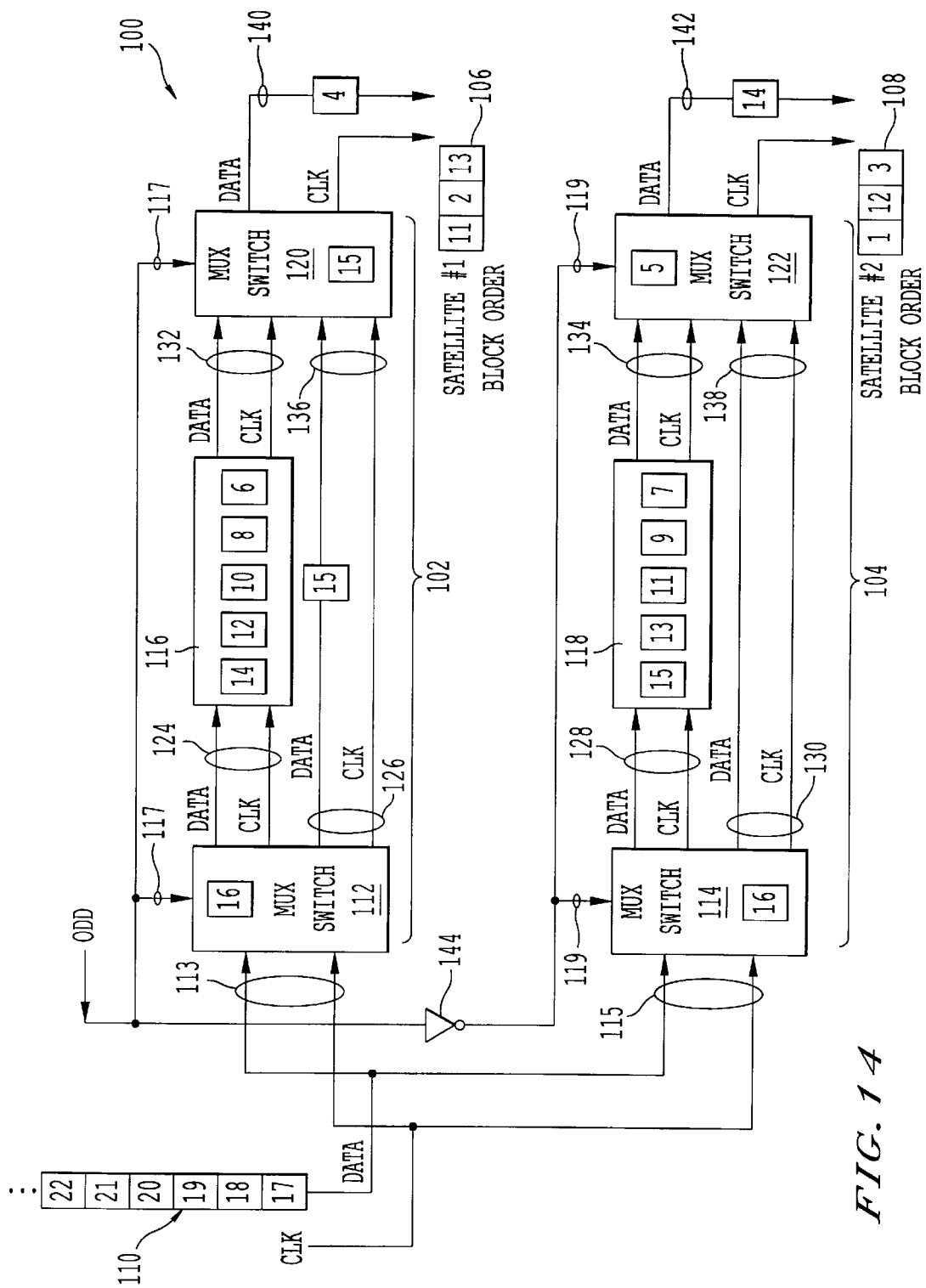

During the next clock cycle and in accordance with the even control signal depicted in FIG. 13, the multiplexer switch 112 provides the frame 16 to the output pair 124 thereof, as shown in FIG. 14. Frame 14 is shifted into the FIFO register 116. The multiplexer switch 120 receives the frame 15 as an input and outputs the frame 4. The multiplexer switch 114 is controlled to provide the frame 16 to the output pair 130 thereof. Frame 15 is shifted into the shift register 118. Accordingly, the frame 5 is shifted into the multiplexer switch 122, while frame 14 is presented at its output 142.

Figure 15:
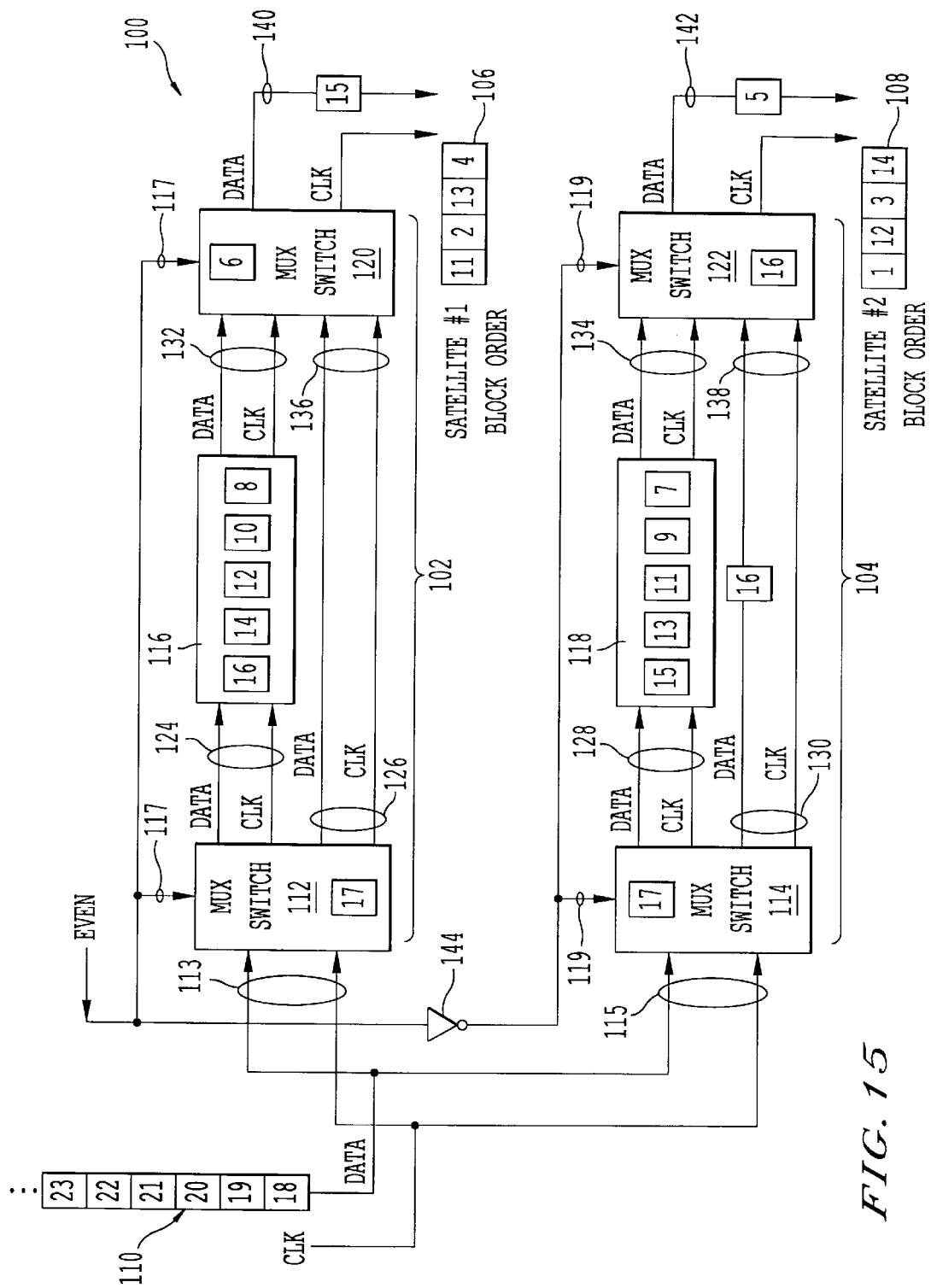
Figure 16:
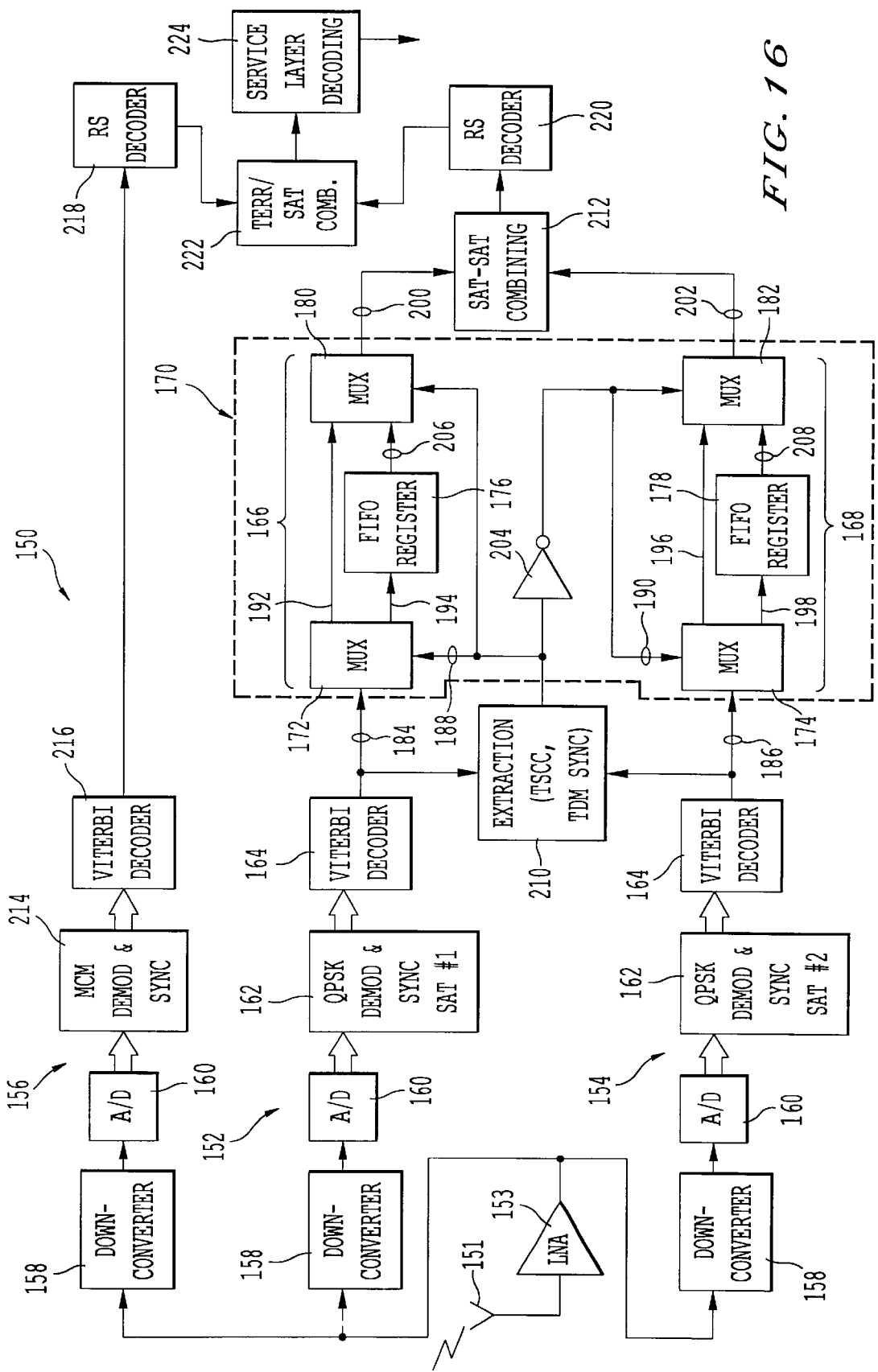
FIG. 16 depicts a receiver comprising a de-interleaver circuit constructed in accordance with an embodiment of the present invention.

In accordance with the odd control signal indicated in FIG. 14, the multiplexer switch 112 provides the frame 17 to the output pair 126 thereof during the next clock cycle, as shown in FIG. 15, while the frame 16 is shifted into the FIFO register 116. Thus, the frame 6 is shifted from the FIFO register 116 into the multiplexer switch 120, while the frame 15 is provided as the output of the multiplexer switch 120. The multiplexer switch 114, on the other hand, provides the frame 17 to the output pair 128 thereof. Frame 16 is shifted into the multiplexer switch 122. Accordingly, frame 5 is provided at the output of the multiplexer switch 122. The foregoing interleaving process described with reference to FIGS. 8–15 continues for the duration of the source bit stream 110.

Signals such as the data streams 106 and 108 are upconverted and transmitted, for example, from broadcast stations in SDARS. In the illustrated embodiment of the present invention depicted in FIG. 16, a receiver 150 (e.g., receiver 14 in FIG. 1) comprises a receiver antenna 151 which is sufficiently broadband to receive first and second satellite channels on different frequencies as well as terrestrial repeater signals. Thus, the exemplary receiver 150 is described with one low noise amplifier 153 and three arms 152, 154 and 156 for a first satellite channel, a second satellite channel and a terrestrial repeater channel, respectively. Each arm has a downconverter 158 comprising an analog-to-digital-converter 160. With regard to the satellite channels, the receiver arms 152 and 154 have QPSK demodulator and synchronization units 162. The resulting data stream in both of the arms 152 and 154 arms is then decoded via a decoder 164 prior to being applied to a de-interleaving circuit 170. The repeater 18 is preferably provided with a similar de-interleaver unit 35 for reordering bits from a satellite broadcast prior to modulation. Alternatively, the repeater 18 can receive the broadcast or source data stream directly via T1 lines, for example, as opposed to a satellite broadcast, in which case no interleaving and subsequent de-interleaving need be done for the reinforced signals. It is to be understood that receivers operating in a fixed location can be configured with only one receiver arm for a single satellite channel.

The de-interleaver circuit 170 is configured similarly with respect to the interleaver circuit 100 described above in connection with FIG. 8. As shown in FIG. 16, the de-interleaver unit 170 comprises two branches 166 and 168 for reordering the cross-channel, interleaved frames or code blocks received in the first satellite channel and the second satellite channel, respectively. Branches 166 and 168 comprise multiplexer switches 172 and 174, first-in-first-out (FIFO) registers 176 and 178, and multiplexer switches 180 and 182, respectively. The multiplexer switches 172 and 174 each have, respectively, a clock input (not shown), a data input 184 and 186, and a control input 188 and 190. Each multiplexer switch 172 and 174 has two pairs of outputs 192 and 194, and 196 and 198. Each pair comprises a data output and clock signal output, as do the interleaving multiplexer switches 112 and 114 described above. One of the output pairs 194 and 198 in each branch is for reordering frames and is therefore connected to the corresponding FIFO register 176 and 178, which also has a data output and a clock signal pair. The other output pair 192 and 196 in each branch is for outputting frames to the other corresponding multiplexer switch 180 and 182 which has a corresponding data output and a clock signal pair indicated at 200 and 202. The control inputs 188 and 190 of the multiplexer switches 172, 174, 180 and 182 are gated every frame or code block cycle. An inverter 204 is provided so that the control input changes state when the next incoming frame or code block in the original data stream is detected. The multiplexer switches 172 and 174 select the output pair 192 and 196 or the output pair 194 and 198, depending on the state of the control input. Similarly, the multiplexer switches 180 and 182 provide one of inputs 206 and 208 from the FIFO register 206 and 208, or the corresponding multiplexer switch 172 and 174 to its output 200 and 202, depending on the state of the control input 188 and 190.

The state of the control input 188 and 190 is provided, for example, by an output signal generated after the two received streams have been demodulated and decoded, and time division multiplexing (IDM) data has been extracted therefrom. For example, preambles provided in each of the TDM frames in the demodulated and decoded data streams are extracted and the information therein used to determine frame information, as indicated at 210. For example, each frame can by provided with a preamble comprising a master frame preamble (MFP) for frame synchronization and time slot control channel (TSCC). The TSCC comprises information such as a master frame counter (MFC) and a TDM identifier (TDM-ID). The MFC is an unsigned integer value (e.g., between 0 and 124) that is incremented after each MFP. The MFC can be used to identify whether a frame in the received data stream is an odd or even frame. The TDM-ID can comprise codes which are selected and inserted into the transmitted data stream to indicate the interleaving algorithm, including how the frames are dispersed in the data stream. The MFC and TDM-ID information is used to generate a control signal which is applied to the multiplexer switches 172, 174, 180 and 182 to determine when each of the frames are to be provided at the outputs thereof to reorder the received data streams. The control signal can be used to randomize the interleaving pattern applied to the data stream sent on each channel independently using an algorithm that is also available to the de-interleaver. This provides an additional level of error protection optimization based on the predicted data channel transmit path error characteristics.

In the illustrated example, the first satellite channel carries an interleaved data stream 106 having even-numbered frames alternating with selected odd-numbered frames. The second satellite channel carries an interleaved data stream 108 having odd-numbered frames alternating with selected even-numbered frames. Accordingly, the FIFOs 176 and 178 are each configured to store five frames.

The control signal from the extraction unit 210 is toggled between the two branches 166 and 168 using the inverter 204. In alternative embodiments, one of the multiplexer switches can be configured to switch to the opposite one of its output pairs in response to the control signal, or the FIFO of one of the branches can be connected to the other output of its corresponding downstream multiplexer switch. In accordance with another embodiment of the present invention, the framing synchronization information can be extracted after the two reordered data streams at outputs 200 and 202 are combined by the combiner 212. Different combining methods can be used. For example, Viterbi decoding can be used. In this case, the extraction unit 210 can use output information from the combiner 212. Thus, if the extraction unit 210 determines that the frame currently being analyzed is an odd frame, the extraction unit 210 generates a control signal for application to the multiplexer switches to provide the frame in proper position at a de-interleaver to be de-interleaved and then processed by the combiner 212.

As stated previously, the control signal is polarized as between the two branches 166 and 168 by the inverter 204, or by other means, to cause an odd-numbered frame arriving at branch 166 to be provided at the output pair 194 of the multiplexer switch 172. The frame arriving at branch 168 is provided to the output pair 196 of the multiplexer switch 174. The next control signal indicates that even-numbered frames next appear at the inputs of the branches 166 and 168 in the de-interleaver circuits 170. The control signal is again polarized as between the two branches to cause the frame arriving at branch 166 to be provided at the output pair 192 of the multiplexer switch 172. The frame arriving at branch 168 is provided to the output pair 198 of the multiplexer switch 174. This process is continued such that frames or the data stream are reordered. In accordance with another embodiment of the present invention, code blocks are interleaved as opposed to frames. Following synchronization via MFP, the number of clock cycles that are counted to locate code block is determined. A code in the TDM-ID can be used to determine polarity and how the code blocks are dispersed in the data stream.

The receiver arm 156 comprises a demodulation and synchronization unit 214 and a decoder 216 such as a Viterbi decoder. The demodulated and decoded signal from the receiver arm 156 can also be decoded using a Reed-Solomon decoder 218. Similarly, the output of the combiner of the two satellite channels can also be processed using a Reed-Solomon decoder 220. The terrestrial and combined satellite signals can then be combined using combiner 222 prior to decoding the service layer information from the recombined signal, as indicated at the decoder 224.

The illustrated embodiment of the present invention employs two interleaved channels 106 and 108 which comprise identical data (i.e., the data in the data stream 110). The data, however, is arranged differently as between the two channels 106 and 108. In accordance with another embodiment of the present invention, the channels 106 and 108 can be provided with complementary data. In other words, data from a data stream is divided and transmitted on two or more channels, and then recovered as the original data stream.

A data stream can be divided using any of a number of different methods. For example, left and right stereo signals can be sent via channels 106 and 108, respectively. Selected signal frequencies can be sent on different transmission channels. The data stream can be divided into predetermined sections (e.g., 100 kHz sections) or sections of different sizes. Sub-components of selected sections can be exchanged on the transmission channels. For example, a data stream can be divided into 0.5 second intervals and a 0.25 second portion of an interval can be exchanged for a 0.25 second portion from another 0.5 second interval for transmission on a transmission channel. Portions of the complementary data in a transmission channel can be interleaved with respect to other portions of complementary data in the channel to improve the signal-to-noise ratio (SNR) of the recovered data.

Sending complementary data on plural transmission channels is advantageous because different techniques can be used to conceal when some of the complementary data is lost during transmission. For example, smoothing operations, error concealment algorithms, interpolation, error correction and other techniques can be used if some of the data is lost. In any event, a significant amount of the data stream is still received (e.g., at least one of the left and right stereo channels is received when data in one of the transmitted channels is lost).

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. An apparatus for interleaving data for transmission comprising the steps of:

an input device for a data stream, the data stream comprising data symbols, each of the data symbols comprising at least one bit:

a first output device configured to reorder at least one of the symbols in the data stream in accordance with a first interleaving pattern to generate a first transmitted data stream; and a second output device configured to reorder at least one of the symbols in the data stream in accordance with a second interleaving pattern to generate a second transmitted data stream;

wherein said first interleaving pattern and said second interleaving pattern are selected to maximize recovery of the source data stream from at least one of said first transmitted data stream and said second transmitted data stream when said first transmitted data stream and said second transmitted data stream are transmitted via respective transmission channels and either of said transmission channels is blocked.

2. An apparatus as claimed in claim 1, wherein said first output device and said second output device are operable to transmit said first transmitted data stream and said second transmitted data stream substantially simultaneously on separate radio frequency channels.

3. An apparatus as claimed in claim 1, wherein said first output device is operable to reorder the data stream in accordance with said first interleaving pattern by dividing the data symbols in said first transmitted data stream into a first plurality of data symbols and a second plurality of data symbols, and interspersing respective ones of said first plurality of data symbols among said second plurality of data symbols throughout said first transmitted data stream.

4. An apparatus as claimed in claim 1, wherein the data symbols are arranged in the data stream in accordance with time division multiplexed frames, each of said frames comprising a selected number of consecutive said data symbols, said first output device being operable to reorder the data symbols in accordance with said first interleaving pattern by dividing said frames in said first transmitted data stream into a first plurality of frames and a second plurality of frames, and interspersing respective ones of said first plurality of frames among said second plurality of frames throughout said first transmitted data stream.

5. An apparatus as claimed in claim 1, wherein the data symbols are arranged in the data stream in accordance with time division multiplexed frames, each of said frames comprising a selected number of consecutive said data symbols, said first output device being operable to reorder the data symbols in accordance with said first interleaving pattern by dividing each of said frames in said first transmitted data stream into a plurality of sub-frames, each of said plurality of sub-frames comprising a selected number of said data symbols, and interspersing respective selected ones of said plurality of sub-frames among the other ones of said plurality of sub-frames throughout said first transmitted data stream.

6. An apparatus as claimed in claim 5, wherein said first output device is further operable to intersperse said selected ones of said sub-frames by a predetermined number of said sub-frames which changes in at least one of said frames in said source data stream.

7. A method of interleaving data for transmission comprising the steps of:

interleaving a source data stream comprising data symbols to generate at least two interleaved streams; and transmitting said two interleaved streams via respective communication channels, the order of said data symbols in said interleaved streams being different from each other and selected to maximize recovery of said source data stream following transmission when at least one of said communication channels is blocked.

\* \* \* \* \*